(12) United States Patent
Fan et al.

(10) Patent No.: US 7,911,777 B2
(45) Date of Patent: Mar. 22, 2011

(54) COMPUTER DRIVE CAGE WITH INTEGRATED BIASING ELEMENTS

(75) Inventors: Cheng-Yuan Fan, Taoyuan (TW); De-Sen Chin, Banciao (TW)

(73) Assignee: Flextronics AP, LLC, Broomfield, CO (US)

( * ) Notice: Subject to any disclaimer, the term of this patent is extended or adjusted under 35 U.S.C. 154(b) by 138 days.

(21) Appl. No.: 12/124,301

(22) Filed: May 21, 2008

(65) Prior Publication Data

US 2008/0291619 A1  Nov. 27, 2008

Related U.S. Application Data

(60) Provisional application No. 60/931,931, filed on May 25, 2007.

(51) Int. Cl.
G06F 1/16 (2006.01)
(52) U.S. Cl. ......... 361/679.36; 361/679.33; 361/679.37; 361/679.39; 312/223.1; 312/223.2
(58) Field of Classification Search ............. 361/679.36, 361/679.39
See application file for complete search history.

(56) References Cited

U.S. PATENT DOCUMENTS

| | | | |
|---|---|---|---|
| 5,682,291 A * | 10/1997 | Jeffries et al. ............ | 361/679.58 |
| 6,310,769 B1 | 10/2001 | Johnson et al. | |
| 6,377,447 B1 | 4/2002 | Boe | |
| 6,377,449 B1 | 4/2002 | Liao et al. | |
| 6,590,848 B1 | 7/2003 | Chen | |
| 6,614,654 B2 * | 9/2003 | Liu et al. .................. | 361/679.33 |
| 6,619,766 B1 * | 9/2003 | Mansueto .................. | 312/223.1 |
| 6,728,109 B1 | 4/2004 | Wu | |
| 6,813,148 B2 * | 11/2004 | Hsu et al. ................. | 361/679.39 |
| 7,035,099 B2 | 4/2006 | Wu | |
| 7,036,783 B2 * | 5/2006 | Chen et al. ................. | 248/298.1 |
| 7,079,380 B2 * | 7/2006 | Wubs ........................ | 361/679.35 |
| 7,102,885 B2 * | 9/2006 | Chen et al. ............... | 361/679.31 |
| 7,130,187 B1 | 10/2006 | Sun | |
| 7,142,419 B2 | 11/2006 | Cochrane | |
| 7,187,541 B2 | 3/2007 | Franke et al. | |
| 7,218,512 B2 * | 5/2007 | Han ......................... | 361/679.31 |
| 7,298,624 B2 * | 11/2007 | Boswell et al. ............... | 361/727 |
| 7,301,762 B2 * | 11/2007 | Han ......................... | 361/679.33 |
| 7,352,569 B2 * | 4/2008 | Muenzer et al. ......... | 361/679.33 |
| 7,483,268 B1 * | 1/2009 | King et al. ................. | 361/679.38 |
| 7,486,509 B2 * | 2/2009 | Kim et al. ................. | 361/679.34 |
| 7,609,509 B2 * | 10/2009 | Wu et al. .................. | 361/679.33 |

(Continued)

FOREIGN PATENT DOCUMENTS

WO  WO2008121396  10/2008

*Primary Examiner* — Jayprakash N Gandhi
*Assistant Examiner* — Anthony Q Edwards
(74) *Attorney, Agent, or Firm* — James L. Johnson; Robert G. Crouch; Marsh Fischmann & Breyfogle LLP

(57) ABSTRACT

A computer drive cage (10) includes a pair of side support panels (14) that are separated by a space (38) to accommodate receipt of one or more computer drives (86). At least one of these support panels (14) includes a computer drive installation slot (46). One or more contacts (62) are aligned with and disposed outside of this slot (46) in a direction that is at least generally away from the computer drive space (38) between the side support panels (14). Each contact (62) for may be integrally-formed with its corresponding side support panel (14).

15 Claims, 4 Drawing Sheets

U.S. PATENT DOCUMENTS

| | | |
|---|---|---|
| 2003/0222555 A1 | 12/2003 | Mansueto |
| 2004/0075978 A1 | 4/2004 | Chen et al. |
| 2005/0040306 A1 | 2/2005 | Chen et al. |
| 2005/0087504 A1 | 4/2005 | Wu |
| 2005/0094367 A1 | 5/2005 | Franke et al. |
| 2005/0099767 A1 | 5/2005 | Wu |
| 2005/0103729 A1 | 5/2005 | Chen et al. |
| 2005/0237709 A1* | 10/2005 | Huang .................. 361/685 |
| 2008/0237156 A1 | 10/2008 | Cheng-Yuan et al. |
| 2008/0291619 A1* | 11/2008 | Fan et al. ............... 361/685 |

* cited by examiner

COMPUTER DRIVE CAGE WITH INTEGRATED BIASING ELEMENTS

CROSS-REFERENCE TO RELATED APPLICATIONS

This patent application claims priority under 35 U.S.C. §119(e) to U.S. Provisional Patent Application Ser. No. 60/931,931, that is entitled "DRIVE CAGE WITH INTEGRATED BIASING ELEMENTS," that was filed on May 25, 2007, and entire disclosure of which is hereby incorporated by reference in its entirety herein.

FIELD OF THE INVENTION

The present invention generally relates to the field of computer drive cages and, more particularly, to retaining computer drives within computer drive cages.

BACKGROUND

Computer drive cages are oftentimes used to integrate one or more computer drives with the chassis of a computer housing (e.g., commonly referred to as a computer case, enclosure, tower, cabinet, or the like). These computer drive cages generally include a pair of side panels, and oftentimes a top panel and bottom panel. The side panels include some kind of structure for slidably receiving and supporting one or more computer drives. A separate contact spring assembly may be attached (e.g., via screws) to at least one of the side panels. When a computer drive is installed in the computer drive cage, this contact spring assembly exerts a force on the computer drive that biases the computer drive at least generally toward the opposite side panel.

SUMMARY

A first aspect of the present invention is directed to a computer drive assembly that includes a computer drive and a computer drive support. The computer drive includes first and second sidewalls that are laterally spaced from each other, where the first sidewall includes a first fastener head. The computer drive support includes first and second support panels that are disposed in laterally spaced relation, where the first side support panel is an integrally-formed structure—there are no joints of any kind in the first side support panel. The first side support panel includes first and second ends, a computer drive installation slot, and a contact. The computer drive moves past the first end of the first side support panel and then toward its second end when being installed in the computer drive support. The computer drive installation slot extends from the first end of the first side support panel toward its second end (e.g., the computer drive installation slot could terminate prior to reaching the second end, or could extend all the way to the second end), and includes first and second slot edges that each extend along a length dimension of the computer drive installation slot. The contact is aligned with the computer drive installation slot, is interconnected with one of the first and second slot edges, and engages the first fastener head on the first sidewall of the computer drive when the computer drive is installed in the computer drive support. Based upon the integral nature of the first side support panel, there is no joint in the interconnection of the contact with the one of the first and second slot edges.

A number of feature refinements and additional features are applicable to the first aspect of the present invention. These feature refinements and additional features may be used individually or in any combination. The following discussion is applicable to the first aspect, up to the start of the discussion of a second aspect of the present invention. The first and second sidewalls of the computer drive may be spaced from each other in the same dimension that the first and second side support panels of the computer drive support are spaced from each other when the computer drive is installed in the computer drive support. The computer drive support may be configured for any appropriate number of computer drives (e.g., may include one or more bays, each of which accommodates a separate computer drive). Any appropriate computer drive may be utilized in combination with the computer drive support, including without limitation a hard disk drive (HDD), a floppy disk drive (FDD), a tape drive, a CD drive, or a DVD drive.

The first sidewall of the computer drive may include a plurality of first fastener heads (e.g., a screw head) that are spaced from each other in the direction that the computer drive is at least generally moved when installing the same in the computer drive support. The first side support panel may include a plurality of contacts, where each contact engages a different first fastener head on the first sidewall of the computer drive when the computer drive is installed in the computer drive support. It should be appreciated that one or more of the contacts could sequentially come into contact with multiple first fastener heads as the computer drive is being installed in the computer drive support.

The first and second side support panels may be characterized as collectively defining a space for receiving the computer drive. The contact may be offset from the computer drive installation slot in a direction that is away from this space that receives a computer drive. The contact may include first and second sections that are disposed in different orientations, where the first section is located between an inlet to this space, and where the computer drive passes through this inlet when being installed in the computer drive support (e.g., the first fastener head will reach the first section of the contact before reaching the second section of the contact as the computer drive is being installed in the computer drive support). The first section of this contact may extend from the second section of the contact in a direction that is at least generally away from the space in which the computer drive is received (e.g., the first section of the first biasing element may "flare out" progressing from the second section of the contact proceeding in the direction of the inlet to the space of the computer drive support that accommodates receipt of a computer drive).

The computer drive installation slot may extend from an inlet end of the above-noted space (e.g., an end of the computer drive support through which a computer drive is initially introduced into the space between the first and second side support panels) toward an opposite end of the computer drive support. The contact may be aligned with but offset from the computer drive installation slot in the lateral dimension. In one embodiment, the computer drive installation slot is located in the lateral dimension between the contact and the space of the computer drive support that accommodates receipt of the computer drive. The first fastener head on the first sidewall of the computer drive may move along this computer drive installation slot as the computer drive is being installed in the computer drive support. In one embodiment, the first fastener head on the computer drive extends entirely through the computer drive installation slot to be engaged by the contact. One or more ribs may be defined from the first side support panel, where each rib extends between the first and second slot edges, and where each rib is disposed outside of the computer drive installation slot (e.g., so as to not impede the travel of any first fastener head along the computer drive installation slot).

The contact may be of any appropriate size, shape, and/or configuration. Multiple contacts may be provided on the first side support panel. Any appropriate number of contacts may be utilized. The second side support panel may be similarly configured to the first side support panel or otherwise. In one embodiment, each contact on the first side support panel is disposed in opposing relation to a contact on the second side support panel. In any case, each contact on the first and/or second side support panel may be used to secure the computer drive within the computer drive support.

The first side support panel may include a first slot that intersects with the computer drive installation slot in proximity to the contact. The first support panel may include a first biasing element in the form of the contact and a flexible section that is collectively defined by the first slot and the computer drive installation slot, where the contact moves along with the flexible section in response to the first fastener head on the first sidewall of the computer drive engaging the contact as the computer drive is installed in the computer drive support. That is, the first fastener head may "push" the contact further away from the space between the first and second side support panels. This movement of the contact may be accommodated by a deflection of the flexible section.

The above-noted flexible section may be that which generates the biasing force exerted by the contact on the computer drive when installed in the computer drive support. In one embodiment, the flexible section at least somewhat elastically deflects as the first fastener head on the first sidewall of the computer drive is brought into engagement with the contact (e.g., which moves the same further away from its corresponding computer drive installation slot). This deflection of the flexible section may generate a force (e.g., via an increase in potential energy in the flexible section by its deflection) that causes the contact to exert a biasing force on the first fastener head that is directly at least generally toward the opposing second side support panel. In one embodiment, the contact exerts a force on the first fastener head that is at least about 1.25 kilograms-force (again being directed at least generally toward the second side support panel of the computer drive support).

Notwithstanding the discussion of one or more contacts, one or more ribs, or the like in relation to the first side support panel, the first side support panel is an integrally-formed structure. As such, the noted contact(s) is integrally-formed with the first side support panel (e.g., of one-piece construction). Moreover, the above-noted rib(s) that may extend across the computer drive installation slot is also integrally formed with the first side support panel.

A second aspect of the present invention is embodied by a computer drive support for removably integrating a computer drive with a computer chassis or other supporting structure. The computer drive support may be interconnected with a computer chassis in any appropriate manner, slidably receives at least one computer drive, and includes first and second side support panels that are spaced from each other, where the first side support panel is an integrally-formed structure. This first side support panel includes a computer drive installation slot and first and second contacts. The first and second contacts are each integrally formed with the first side support panel, are aligned with the computer drive installation slot, are spaced from each other along the computer drive installation slot, and engage a computer drive when installed in the computer drive support.

A third aspect of the present invention is embodied by a computer drive support for removably integrating a computer drive with a computer chassis or other supporting structure. The computer drive support may be interconnected with a computer chassis in any appropriate manner, slidably receives at least one computer drive, and includes first and second side support panels that are spaced from each other, where the first side support panel is an integrally-formed structure. The first side support panel includes a computer drive installation slot, a first slot that intersects with the computer drive installation slot, a first flexible section collectively defined by the computer drive installation slot and the first slot, and a first contact that is interconnected with the first flexible section and that is aligned with the computer drive installation slot.

The various features discussed above in relation to the first aspect are equally applicable to each of the above-noted second and third aspects, individually and in any combination. Although the computer drive installation slot of the second and third aspects may correspond with the computer drive installation slot of the first aspect, the computer drive installation slot of the second and third aspects is not required to extend from one end of the first side support panel toward (and including to) its opposite end.

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a side support panel includes "a first contact" alone does not mean that the side support panel includes only a single "first contact"). Moreover, any failure to use phrases such as "at least one" also does not limit the corresponding feature to the singular (e.g., indicating that a side support panel includes "a contact" versus "at least one contact" alone does not mean that the side support panel includes only a single "contact").

DETAILED DESCRIPTION

Figure 1A:
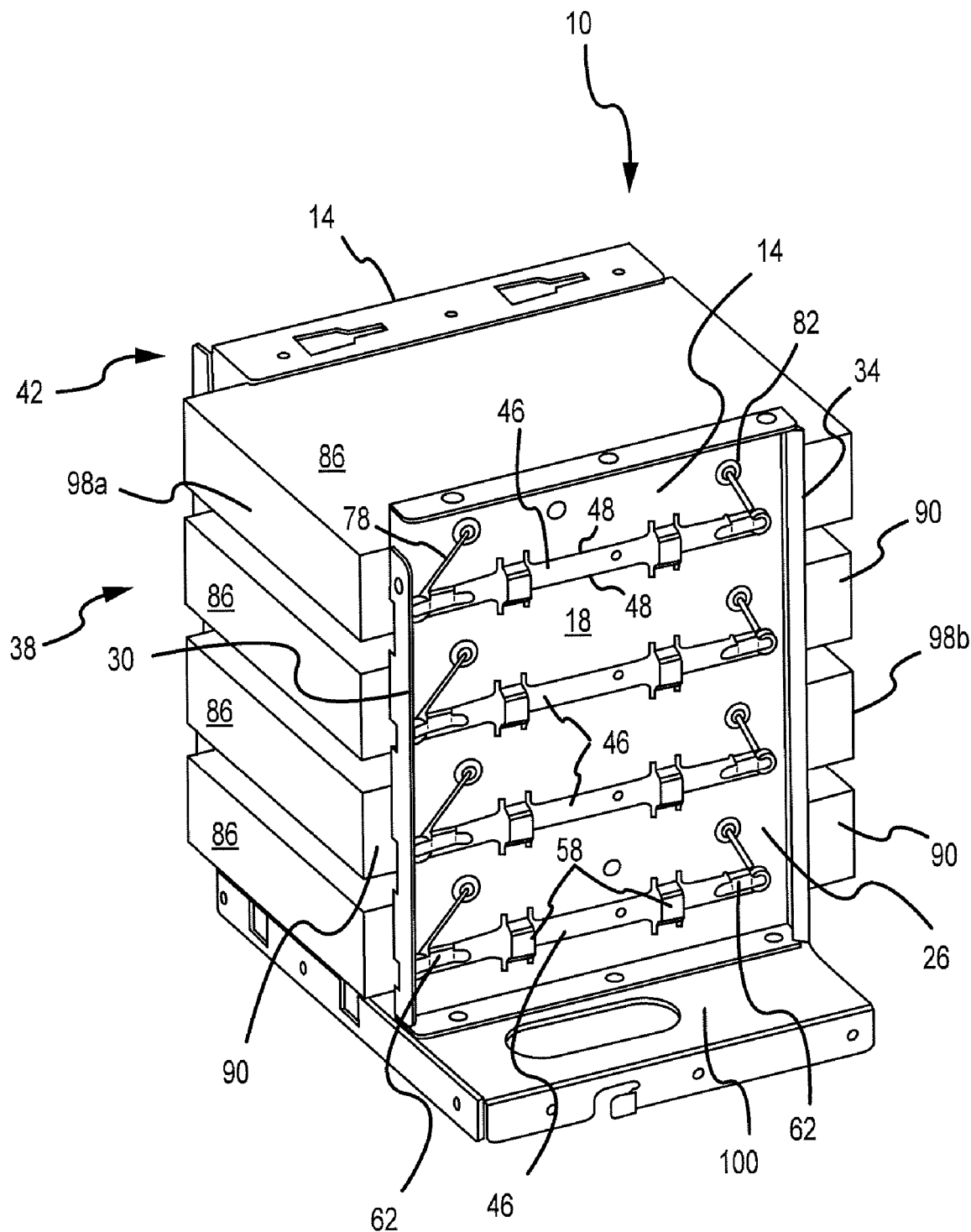
FIG. 1A is a perspective view of one embodiment of a computer drive cage that accommodates multiple computer drives and that utilizes integral biasing elements or contact springs for interfacing with the computer drives.
Figure 1B:
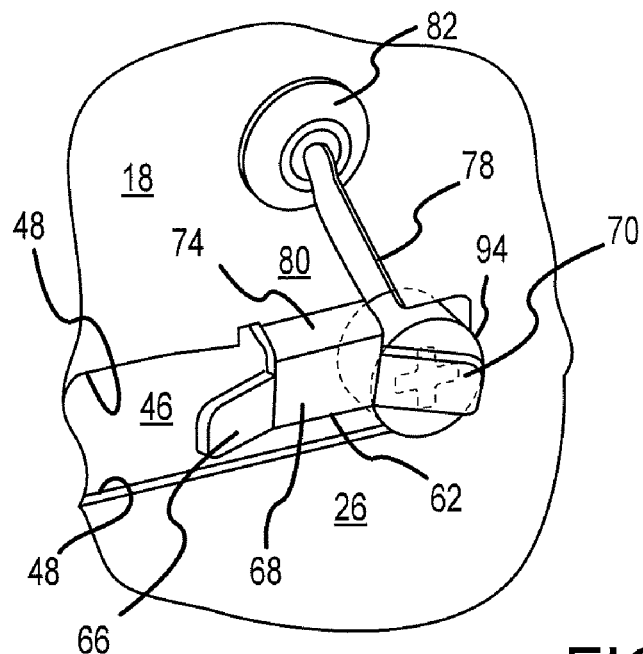
FIG. 1B is an enlarged view of one of the biasing elements or contact springs used by the computer drive cage of FIG. 1A.
Figure 1C:
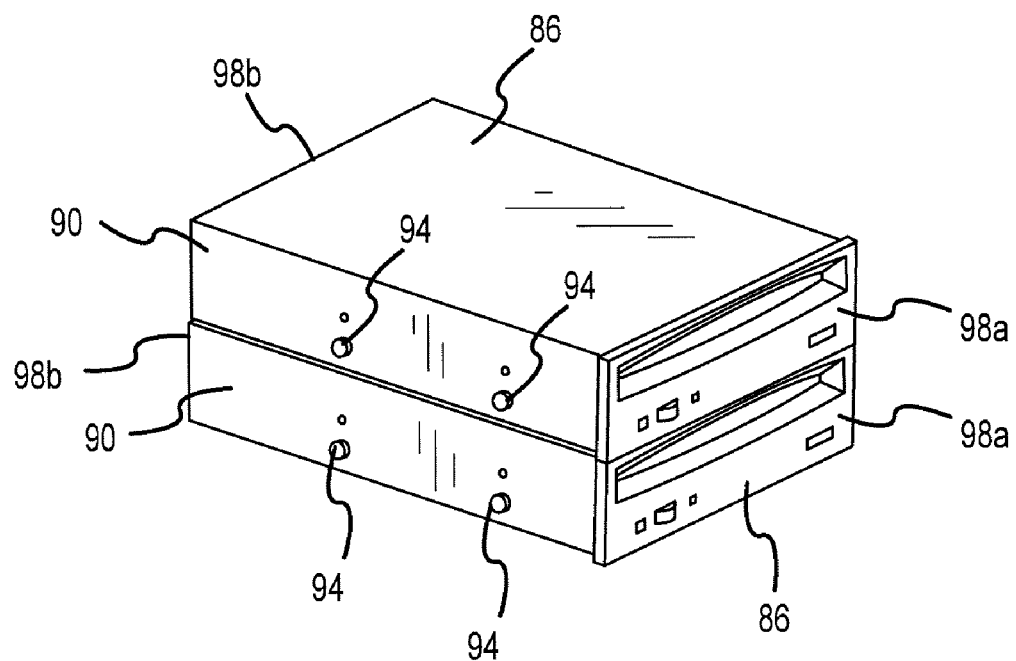
FIG. 1C is a perspective view of a pair of computer drives that may be installed in the computer drive cage of FIG. 1A.
Figure 2:
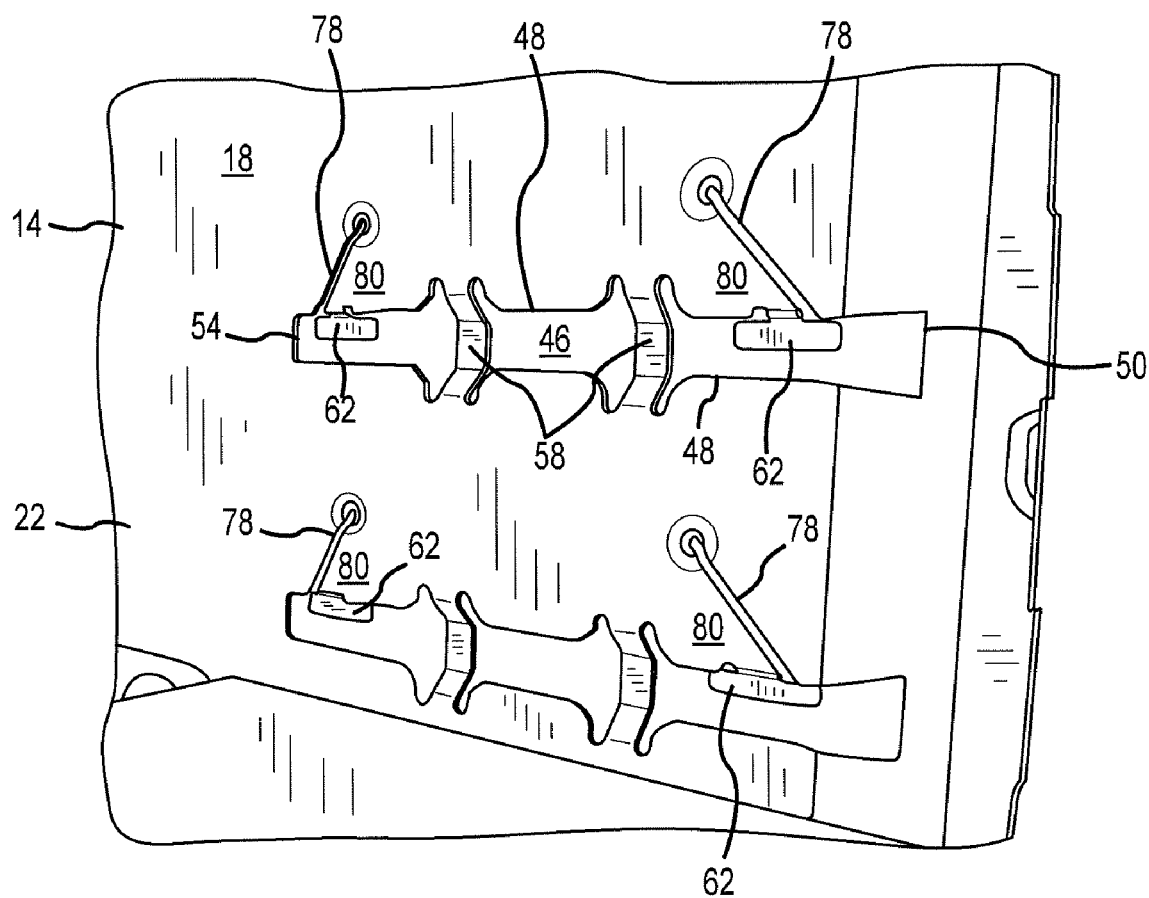
FIG. 2 is a perspective view of an interior surface of one of the side support panels or brackets that defines the computer drive cage of FIG. 1A.

FIGS. 1A-3B illustrate one embodiment of a computer drive cage 10 that may be utilized to interconnect one or more computer drives 86 with a computer chassis 100 or other supporting structure. Each of the computer drives 86 may be of any appropriate type, such as a hard disk drive (HDD), a floppy disk drive (FDD), a CD drive, or a DVD drive. Although the computer drive cage 10 accommodates removably interconnecting multiple computer drives 86 with the chassis 100, the computer drive cage 10 may be adapted to removably interconnect any number of computer drives 86 with the chassis 100, including a single computer drive 86 (not shown). Generally, the computer chassis 100 may be of any appropriate size, shape, configuration, and/or type, such as for a desktop computer application (e.g., the chassis 100 may be in the form of a "tower" or cabinet of a conventional desktop computer).

Each computer drive 86 is slidably and removably secured within the computer drive cage 10. In this regard, at least one side 90 of each computer drive 86, and each of a pair of opposing sides 90, includes a plurality of fastener or screw heads 94 that facilitate the retention of the computer drive 86 within the computer drive cage 10. Generally, the screw heads 94 are the ends of screws that are detachably engaged with the computer drive 86 and are positioned such that the computer drive cage 10 exerts a biasing force on these screw heads 94 to both detachably retain the computer drive 86 within the computer drive cage 10, and furthermore to reduce vibration of the computer drive 86 relative to the chassis 100. Alternatively, the sides 90 of the computer drive 86 could include other appropriate protrusions. In any case, each computer drive 86 also includes what may be characterized as a front end 98a and a rear end 98b.

The computer drive cage 10 includes a pair of side support panels or brackets 14 that may be fixed relative to, attached to, or otherwise integrated with the chassis 100 in any appropriate manner (e.g., detachably, using one or more appropriate fasteners). The pair of side support panels 14 are disposed in spaced relation to each other to define a space 38 in which one or more computer drives 86 may be disposed and supported by the pair of side support panels 14. A region 42 coincides with where the computer drives 86 are initially introduced into the space 38 to install the computer drives 86 within the computer drive cage 10. Therefore, the region 42 may also be characterized as an inlet 42 to the space 38.

A first end 30 of each side support panel 14 coincides with where the computer drives 86 are initially introduced into the computer drive cage 10 during installation (e.g., the first end 30 of the side support panels 14 is at least generally disposed at the inlet 42 to the space 38). Similarly, each side support panel 14 further includes a second end 34 that is opposite of its corresponding first end 30. When a computer drive 86 is installed in the computer drive cage 10, its rear end 98b is the leading portion of the computer drive 86, such that this rear end 98b is directed through the inlet 42 and into the space 38 between the side support panels 14 at least generally in the direction of the second end 34 of the support panels 14. Each computer drive 86 extends past the second 34 in the illustrated embodiment, although this may not be the case in other instances.

Each support panel 14 may be formed from any appropriate material or combination of materials, but will typically be formed from an appropriate metal of an appropriate gauge or stiffness. An inner surface 22 of a given side support panel 14 faces the opposing side support panel 14 and thereby interfaces with the space 38 occupied by the various computer drives 86. Stated another way, the inner surface 22 of each side support panel 14 is that which at least generally projects toward the computer drives 86 that are installed in the computer drive cage 10. Each side support panel 14 also includes an outer surface 26 that is disposed opposite of its corresponding inner surface 22.

At least one of the side support panels 14 of the drive cage 10 may be an integrally-formed structure—being of one-piece construction and not including any joints of any kind. At least one of the side support panels 14 of the computer drive cage 10 includes at least one integral contact spring or biasing element for providing a desirable interface with each computer drive 86 that is installed in the computer drive cage 10, although each of the pair of side support panels 14 could utilize at least one integral contact spring or biasing element to interface with a corresponding computer drive 86. A side support panel 14 that includes at least one such contact spring or biasing element will now be described. It should thereby be appreciated that this discussion is applicable to a computer drive cage 10 having only one of its side support panels 14 with the configuration to now be described, as well as a computer drive cage 10 having a pair of side support panels 14 with the configuration to now be described (i.e., where each side support panel 14 includes at least one integrally-formed contact spring or biasing element for each computer drive 86).

A given side support panel 14 may include what may be characterized as a primary section 18 that is of a flat or planar configuration in the illustrated embodiment. A computer drive installation slot 46 extends at least generally from the first end 30 of the side support panel 14 toward, but not to, an opposite second end 34. As such, the computer drive installation slot 46 may be characterized as having an open first end 50 and a closed second end 54. A pair of slot edges 48 defines the width of the computer drive installation slot 46, as each slot edge 48 extends along the entire length dimension of the computer drive installation slot 46.

There is one computer drive installation slot 46 on the support panel 14 for each computer drive 86 to be installed within the computer drive cage 10. At least one rib 58 extends across the computer drive installation slot 46 somewhere between its first end 50 and its second end 54 to provide structural integrity. Any number of ribs 58 could be utilized for each slot 46. In the illustrated embodiment, the ribs 58 are convexly-shaped relative to the outer surface 26 of the primary section 18 of the support panel 14. That is, the ribs 58 "bulge" away from the computer drives 86 when installed in the computer drive cage 10. Stated another way, each rib 58 is disposed outside of or in offset relation to the corresponding computer drive installation slot 46 in a direction that is away from the space 38 between the side support panels 14. As such, the screw heads 94 on the associated computer drive 86 should be able to move along the computer drive installation slot 46 without being impeded by any ribs 58.

A pair of contacts 62 is also provided for each computer drive installation slot 46 of the side support panel 14. Any appropriate number of contacts 62 could be utilized. In the illustrated embodiment, one of these contacts 62 is located at least generally toward the first end 50 of the computer drive installation slot 46, while another of these contacts 62 is located at least generally toward the second end 54 of the same computer drive installation slot 46. However, each contact 62 may be disposed at any appropriate location along the corresponding computer drive installation slot 46. Generally, each contact 62 exerts a biasing force on the corresponding screw head 94 on the side 90 of one of the computer drives 86 when installed in the computer drive cage 10.

Each contact 62 is at least generally aligned with the corresponding computer drive installation slot 46. In the illustrated embodiment, however, each contact 62 is actually disposed outside of the corresponding computer drive installation slot 46. More specifically, each contact 62 is disposed beyond the corresponding computer drive installation slot 46 in a direction that is away from the space 38 in which the computer drives 86 are installed in the computer drive cage 10. Stated another way, each contact 62 is offset from the primary section 18 of the corresponding support panel 14 in a direction that is away from the space 38 in which the computer drives 86 are installed in the computer drive cage 10 (e.g., the primary section 18 occupies an intermediate position between a contact 62 and the space 38). Stated yet another way, each contact 62 is "bulged" outwardly relative to the outer surface 26 of the primary section 18 of the associated side support panel 14.

The contact 62 includes a first contact section 66, a second contact section 68, and a third contact section 70 in the illustrated embodiment. A contact anchor leg 74 extends from the contact 62 to one of the slot edges 48. The first contact section 66, second contact section 68, and third contact section 70 are each at least generally aligned with the corresponding computer drive installation slot 46, while the corresponding contact anchor leg 74 interconnects its contact 62 with the primary section 18 of the support panel 14. As such, the contact 62 may be characterized as being interconnected with one of the slot edges 48 of the computer drive installation slot 46. In one embodiment, the contact 62 is integrally formed with the primary section 18 of the support panel 14. That is and for this embodiment, the contact 62 is not separately attached to the side support panel 14. Therefore, the reference to the contact 62 having different sections does not mean that these are separately attached parts. Instead, the entire side support panel 14 may be of an integral construction, thereby alleviating the need for any "attachment" operations.

The first contact section 66 and its corresponding second contact section 68 may be disposed in different orientations. The first contact section 66 extends from its corresponding second contact section 68 at least generally toward the inlet 42 (associated with the space 38 in which the computer drives 86 are disposed) when installed in the computer drive cage 10, and furthermore at least generally away from this space 38. That is, the first contact section 66 diverges away from its corresponding computer drive installation slot 46 proceeding in the direction of the inlet 42 of the space 38. The corresponding second contact section 68 may be disposed at least generally parallel with the primary section 18 of the support panel 14. Other orientations may be appropriate for the second contact section 68. Although the second contact section 68 and the third contact section 70 could be of a common orientation, different orientations could also be utilized as shown (e.g., where the third section 70 diverges at least generally away from the space 38 proceeding from its second contact section 68). Generally, the first contact section 66 facilitates a screw head 94 on the side 90 of a computer drive 86 progressing "under" the contact 62 when the corresponding computer drive 86 is being installed in the computer drive cage 10, and furthermore such that the screw head 94 may ultimately be biasingly engaged by the contact 62. In the fully installed state, a screw head 94 of the computer drive 86 may be engaged by any portion of the contact 62.

A spring slot 78 extends toward and intersects with the computer drive installation slot 46 in proximity to the contact 62. The spring slot 78 may allow at least substantially the entirety of the associated contact 62 to move at least generally away from the space 38 when a computer drive 86 is being installed in the computer drive cage 10. That is, the computer drive installation slot 46 and the spring slot 78 may collectively define a flexible section 80, which in turn, is structurally interconnected with a contact 62 by its corresponding contact anchor section 74. A flexible section 80 and its associated contact 62 may collectively define a biasing element. As the flexible section 80 moves (by a deflection), so too does the associated contact 62.

The above-noted spring slot 78 may be many appropriate size, shape, and/or configuration that allows its corresponding contact 62 to move in response to engaging a screw head 94 on a side 90 of the computer drive 86. In one embodiment, neither the contact 62 nor its contact anchor section 74 appreciably deflects 74. Instead, at least substantially the entirety of the contact 62 may be allowed to move relative to the primary section 18 of the support panel 14 by a deflection of its flexible section 80.

In the illustrated embodiment, each spring slot 78 terminates at a protrusion 82, which is a convexly-shaped structure relative to the outer surface 26 of the side support panel 14 in the illustrated embodiment. Moreover, the two spring slots 78 associated with a common computer drive installation slot 46 extend from the computer drive installation slot 46 in a "converging" direction (e.g., the closed ends of the two spring slots 78 associated with a common computer drive installation slot 46 are spaced closer together than the ends of these spring slots 78 at the merger with the computer drive installation slot 46).

In one embodiment, the contact between a side support panel 14 and the computer drives 86 in the installed position may be limited to one of the slot edges 48 and the contacts 62. In this case, one of the contact edges 48 and the contacts 62 would provide the sole support for at least one side of the associated computer drive 86 within the computer drive cage 10. That is, the computer drive installation slot 46 and contacts 62 may alleviate the need to utilize separate supporting structures on the inner surface 22 of the side support panel(s) 14 (e.g., a rail or rail-like structure to provide vertical support for the computer drives 86 when installed in the computer drive cage 10, and when the same is disposed in the FIG. 1A orientation). In any case, each contact 62 may generate a clamp spring force of at least about 1.25 kgf on the corresponding computer drive 86 when installed in the computer drive cage 10. However, the contacts 62 could also be utilized along with any appropriate additional supporting structure (e.g., on the inner surface 22) for the computer drives 86 when installed in the computer drive cage 10.

At least one of the side support panels 14 will include at least one computer drive installation slot 46 and at least one contact 62 that is integrally-formed with the side support panel 14, although each such side support panel 14 could be of this configuration. However, the "other" side support panel 14 could include a computer drive installation slot 46 but no contacts 62, or could utilize any other appropriate structure to support and slidably receive a computer drive 86 (i.e., it may be such that only one of the side support panels 14 includes a computer drive installation slot 46 to support a given computer drive 86). For convenience, the installation of a computer drive 86 within the computer drive cage 10 will be summarized with regard to how one side 90 of the computer drive 86 interfaces with a computer drive installation slot 46 having multiple contacts 62 that are integrally-formed with the corresponding side support panel 14.

The rear end 98b of the computer drive 86 is the structure of the computer drive 86 that leads into the space 38 defined by the pair of side support panels 14 of the computer drive cage 10. The screw heads 94 on the side 90 of the computer drive 86 will be aligned with the computer drive installation slot 46 on the corresponding side support panel 14. As the computer drive 86 is advanced relative to the computer drive cage 10 (e.g., with the screw heads 94 on a side 90 of the computer drive 86 "riding" within the computer drive installation slot 46), the screw head 94 that is closest to the rear end 98b of the computer drive 84 will first encounter and move the contact 62 that is closest to the inlet 42 to the space 38. This movement of the contact 62 is in a direction that is at least generally away from the space 38. Moreover, this movement is provided by a deflection of its corresponding flexible section 80 at least generally away from the space 38. The contact 62 should not appreciably deflect relative to its contact anchor leg 74, nor should the contact anchor leg 74 appreciably deflect relative to the flexible section 80.

Figure 3A:
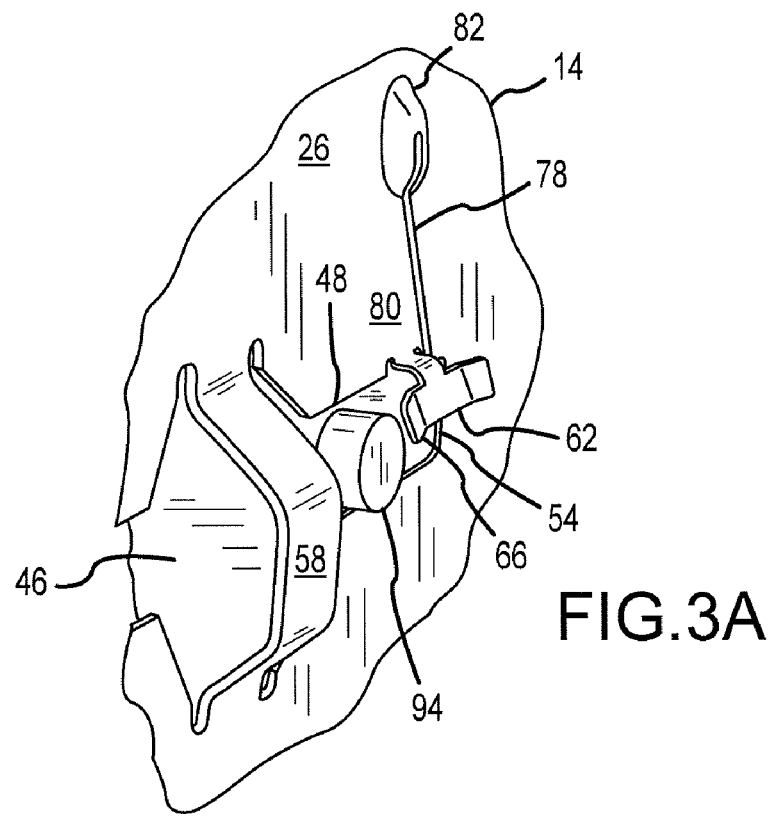
FIG. 3A is an enlarged perspective view of a contact of a biasing element before engaging a computer drive.
Figure 3B:
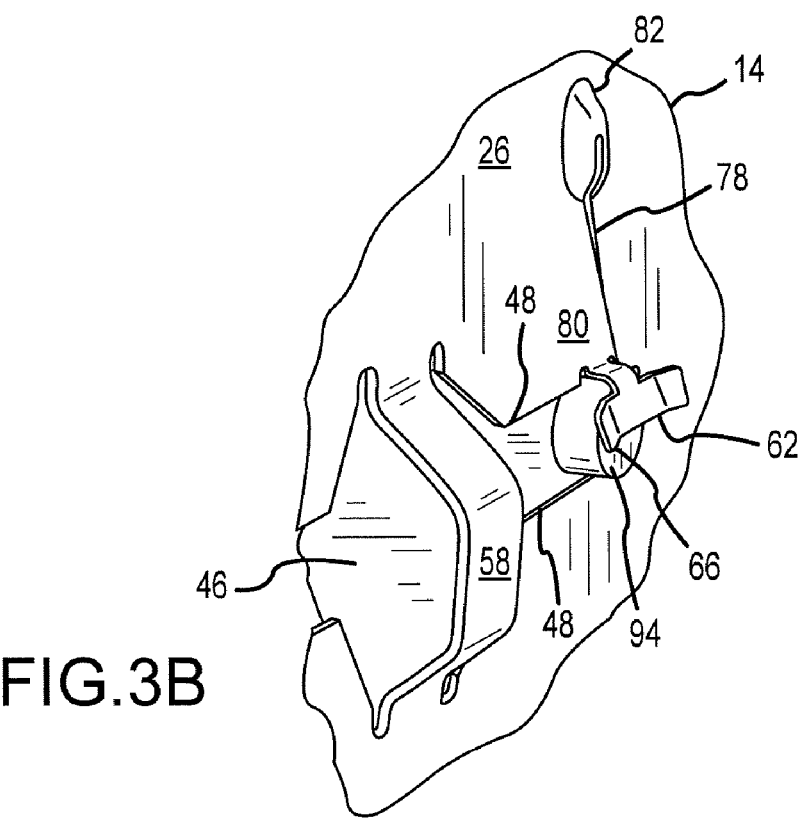
FIG. 3B is an enlarged perspective view of a contact of a biasing element after engaging a computer drive.

A comparison of FIGS. 3A and 3B illustrates the above-noted deflection of a flexible section 80. FIG. 3A represents an "un-deflected" state for a flexible section 80, while FIG. 3B represents a deflected state for a flexible section 80. Note the "narrowing" of the slot 78 in FIG. 3B compared to FIG. 3A, which indicates that the flexible section 80 has deflected away from the space 38 in the above-noted manner.

After a screw head 94 is advanced past the "leading" contact 62, this contact 62 should at least substantially return to its original position (e.g., by the elasticity of the associated flexible section 80). Continued advancement of the computer drive 86 relative to the computer drive cage 10 should ultimately result in each screw head 94 being directed "under" a corresponding one of the contacts 62 by a deflection of its corresponding flexible section 80. Once again, the above-noted "angling" of the first contact section 66 facilitates the screw head 94 being able to be directed "under" or "behind" the contact 62.

Any portion of each contact 62 may engage its corresponding screw head 94 on the computer drive 86 when fully installed in the computer drive cage 10. However, in one embodiment the second contact section 68 or third section 70 is that which engages its corresponding screw head 94. In any case, the above-noted deflection of each flexible section 80 increases its potential or stored energy, which results in it exerting a biasing force on its corresponding contact 62 at least generally in the direction of the space 38 or opposing side support panel 14. Since the contact 62 is engaged with a screw head 94 of the computer drive 86, this same biasing force is exerted on the computer drive 86. In one embodiment, each contact 62 exerts a biasing force of at least about 1.25 kgf on the computer drive 86 via the engaged screw head 94.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A computer drive support for removably integrating a computer drive with a computer chassis, comprising:
    a first side support panel that is an integrally-formed structure such that said first side support panel is of one-piece construction and such that there are no joints in said first side support panel, wherein said first side support panel is interconnectable with a computer chassis and slidably receives a computer drive, wherein said first side support panel comprises:
        a primary section;
        a computer drive installation slot within said primary section; and
        first and second contacts that are integral with said primary section such that there is a lack of any joint between said first and second contacts and said primary section, wherein said first and second contacts are aligned with said computer drive installation slot, are spaced along said computer drive installation slot, and engage the computer when installed in said computer drive support; and
    a second side support panel that is spaced from said first side support panel, wherein said first side support panel further comprises first and second slots that each intersect with said computer drive installation slot in proximity to said first and second contacts, respectively, wherein said computer drive support further comprises first and second biasing elements, wherein said first biasing element comprises said first contact and a first flexible section that is collectively defined by said first slot and said computer drive installation slot, wherein said first contact moves along with said first flexible section as the computer drive is installed in said computer drive support, wherein said second biasing element comprises said second contact and a second flexible section that is collectively defined by said second slot and said computer drive installation slot, and wherein said second contact moves along with second flexible section as the computer drive is installed in said computer drive support.

2. The computer drive support of claim 1, wherein said first side support panel further comprises first and second ends, wherein the computer drive moves past said first end and then toward said second end when being installed in said computer drive support, and wherein said computer drive installation slot extends from said first end toward said second end.

3. The computer drive support of claim 1, wherein said first and second contacts are disposed out of said computer drive installation slot in a direction that is away from a space between said first and second side support panels.

4. The computer drive support of claim 1, wherein said computer drive installation slot comprises first and second slot edges that extend along a length dimension of said computer drive installation slot, wherein said first contact is interconnected with one of said first and second slot edges, and wherein said second contact is interconnected with one of said first and second slot edges.

5. The computer drive support of claim 4, wherein said first side support panel further comprises at least one rib that extends between said first and second slot edges outside of said computer drive installation slot.

6. A computer drive assembly comprising a computer drive and the computer drive support of claim 1, wherein first and second fastener heads are disposed on a first sidewall of said computer drive, and wherein said first and second contacts engage said first and second fastener heads, respectively, when said computer drive is installed within said computer drive support.

7. The computer drive support of claim 1, wherein said first and second contacts being part of said first side support panel, which is of said one-piece construction, alleviates a need to separately attach said first and second contacts to said first side support panel.

8. A computer drive support for removably integrating a computer drive with a computer chassis, comprising:
    a first side support panel that is an integrally-formed structure such that said first side support panel is of one-piece construction and such that there are no joints in said first side support panel, wherein said first side support panel is interconnectable with a computer chassis and slidably receives a computer drive, wherein said first side support panel comprises:

a primary section;

a computer drive installation slot within said primary section;

a first slot within said primary section that intersects with said computer drive support slot;

a first flexible section collectively defined by said computer drive installation slot and said first slot, and that is integral with said primary section such that there is a lack of any joint between said primary section and said first flexible section; and a first contact that is integral with said first flexible section such that there is a lack of any joint between said first contact and said first flexible section, wherein said first contact is aligned with said computer drive installation slot; and a second side support panel that is spaced from said first side support panel.

9. The computer drive support of claim 8, wherein said first side support panel further comprises first and second ends, wherein the computer drive moves past said first end and then toward said second end when being installed in said computer drive support, and wherein said computer drive installation slot extends from said first end toward said second end.

10. The computer drive support of claim 8, wherein said first slot extends from a first anchor to said computer drive installation slot.

11. The computer drive support of claim 10, wherein said first anchor comprises a first indentation on said first side support panel.

12. The computer drive support of claim 8, wherein said first slot extends from said computer drive installation slot at least generally toward a farthest end of said computer drive installation slot.

13. The computer drive support of claim 8, wherein said first contact is disposed out of said computer drive installation slot in a direction that is away a space between said first and second side support panels.

14. A computer drive assembly comprising a computer drive and the computer drive support of claim 8, wherein a first fastener head is disposed on a first sidewall of said computer drive, wherein said first flexible section flexes away from said computer drive when said first contact is brought into engagement with said first fastener head as said computer drive is moved relative to said computer drive support to install said computer drive within said computer drive support.

15. The computer drive support of claim 8, wherein said first contact being part of said first side support panel, which is of said one-piece construction, alleviates a need to separately attach said first contact to said first side support panel.

* * * * *